(12) United States Patent
Hosoi et al.

(10) Patent No.: US 10,614,841 B1
(45) Date of Patent: Apr. 7, 2020

(54) THERMALLY ASSISTED MAGNETIC HEAD, METHOD FOR REDUCING REFLECTED LIGHT, HEAD GIMBAL ASSEMBLY, AND HARD DISK DRIVE

(71) Applicant: SAE Magnetics (H.K.) Ltd., Hong Kong (HK)

(72) Inventors: Ryo Hosoi, Hong Kong (HK); Seiichi Takayama, Hong Kong (HK); Natsuo Nishijima, Hong Kong (HK); Takashi Honda, Hong Kong (HK)

(73) Assignee: SAE MAGNETICS (H.K.) LTD., Hong Kong (HK)

( * ) Notice: Subject to any disclaimer, the term of this patent is extended or adjusted under 35 U.S.C. 154(b) by 0 days.

(21) Appl. No.: 16/205,272

(22) Filed: Nov. 30, 2018

(51) Int. Cl.
| | |
|---|---|
| *G11B 5/31* | (2006.01) |
| *G11B 5/48* | (2006.01) |
| *G11B 5/60* | (2006.01) |
| *G11B 11/105* | (2006.01) |
| *G11B 5/00* | (2006.01) |

(52) U.S. Cl.
CPC ............ *G11B 5/4826* (2013.01); *G11B 5/314* (2013.01); *G11B 5/4866* (2013.01); *G11B 5/6088* (2013.01); *G11B 11/10536* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 5,228,024 | A * | 7/1993 | Moon | G11B 11/10586 360/131 |
| 8,223,596 | B2 * | 7/2012 | Chou | G11B 5/314 369/13.13 |
| 8,681,594 | B1 * | 3/2014 | Shi | G11B 5/6088 369/112.27 |
| 9,123,374 | B1 * | 9/2015 | Tohmon | G11B 5/4866 |
| 9,165,572 | B2 * | 10/2015 | Takei | G11B 5/6088 |
| 9,484,051 | B1 * | 11/2016 | Krichevsky | G11B 5/3133 |
| 9,558,769 | B1 * | 1/2017 | Kim | G11B 5/314 |
| 2007/0139818 | A1 * | 6/2007 | Shimazawa | G11B 5/3136 360/125.31 |
| 2011/0090770 | A1 * | 4/2011 | Iwanabe | G11B 5/314 369/13.24 |
| 2011/0205661 | A1 | 8/2011 | Komura et al. | |

(Continued)

FOREIGN PATENT DOCUMENTS

| | | |
|---|---|---|
| JP | 2002298302 A | 10/2002 |
| JP | 2012084216 A | 4/2012 |

(Continued)

*Primary Examiner* — William J Klimowicz

(57) ABSTRACT

A thermally assisted magnetic head includes a slider, the slider includes a slider substrate and a magnetic head part. The magnetic head part includes a medium-opposing surface opposing a magnetic recording medium, a light source-opposing surface arranged rear side of the medium-opposing surface, an anti-reflection film formed on the light source-opposing surface, a core layer and a cladding layer. The anti-reflection film includes a stacked structure which a first layer and a second layer are stacked. The second layer is formed with high refractive index dielectric having the refractive index higher than the first layer.

8 Claims, 19 Drawing Sheets

(56) References Cited

U.S. PATENT DOCUMENTS

| | | |
|---|---|---|
| 2012/0008470 A1* | 1/2012 | Shimazawa ............ G11B 5/314 369/13.24 |
| 2012/0051195 A1* | 3/2012 | Shimizu ................ G11B 5/314 369/13.17 |
| 2012/0134246 A1* | 5/2012 | Shimazawa ............ G11B 5/02 369/13.26 |
| 2012/0155232 A1 | 6/2012 | Schreck et al. |
| 2013/0279310 A1 | 10/2013 | Zhong et al. |
| 2015/0154988 A1 | 6/2015 | Takei et al. |
| 2015/0364899 A1 | 12/2015 | Tatah et al. |
| 2015/0380035 A1 | 12/2015 | Takei et al. |

FOREIGN PATENT DOCUMENTS

| | | | |
|---|---|---|---|
| JP | 2013140671 A | 7/2013 | |
| WO | 9809284 A1 | 3/1998 | |
| WO | WO-2013163341 A1 * | 10/2013 | ............... G02B 1/11 |

* cited by examiner

Fig.9

| | Reflection Rate of wave length 800nm (%) | |
|---|---|---|
| | Core layer (TaOx) | Cladding layer (AlOx) |
| No Anti-reflection Film | 12.4 | 7.6 |
| Anti-reflection Film made of Sio2:140nm | 0.009 | 0.613 |
| Anti-reflection Film made of Sio2:148nm & TaOx:51nm | 0.23 | 0.14 |
| Anti-reflection Film made of Sio2:148nm & TaOx:51nm & AlOx:29nm | 0.172 | 0.197 |

| layer-1 | | layer-2 | |
|---|---|---|---|
| mat | thk[nm] | mat | thk[nm] |
| TaOx | 40~60 | SiO2 | 145~155 |
| TaOx | 40~60 | SiO2 | 415~425 |
| TaOx | 130~150 | SiO2 | 122~132 |
| TaOx | 130~150 | SiO2 | 395~405 |
| TaOx | 230~250 | SiO2 | 142~152 |
| TaOx | 230~250 | SiO2 | 415~425 |
| TaOx | 320~340 | SiO2 | 122~132 |
| TaOx | 320~340 | SiO2 | 398~402 |
| TiO2 | 10~15 | SiO2 | 155~165 |
| TiO2 | 10~15 | SiO2 | 428~438 |
| TiO2 | 128~138 | SiO2 | 110~120 |
| TiO2 | 128~138 | SiO2 | 385~395 |
| TiO2 | 150~160 | SiO2 | 155~165 |
| TiO2 | 150~160 | SiO2 | 428~438 |
| TiO2 | 270~280 | SiO2 | 110~120 |
| TiO2 | 270~280 | SiO2 | 385~395 |
| TiO2 | 295~305 | SiO2 | 155~165 |
| TiO2 | 295~305 | SiO2 | 428~438 |

Fig. 19

THERMALLY ASSISTED MAGNETIC HEAD, METHOD FOR REDUCING REFLECTED LIGHT, HEAD GIMBAL ASSEMBLY, AND HARD DISK DRIVE

BACKGROUND

Field of the Invention

The present invention relates to a thermally assisted magnetic head recording data on a magnetic recording medium by thermally assisted magnetic recording using near-field light and a method for reducing reflected light of laser light being used by the thermally assisted magnetic head, a head gimbal assembly and a hard disk drive each having a thermally assisted magnetic head.

Related Background Art

In recent years, as magnetic disk drives have been increasing their recording densities, thin-film magnetic heads recording data on a magnetic recording media have been required to further improve their performances. As the thin-film magnetic heads, those of composite type having a structure in which a reproducing head having a magnetoresistive device (hereinafter, referred to also as an "MR device") for read and a recording head having an electromagnetic coil device for write are laminated have been conventionally in wide use. In a magnetic disk drive, the thin-film magnetic head is provided on a slider which very slightly floats from the magnetic recording medium.

Incidentally, the magnetic disk drive records data by magnetizing magnetic fine particles on the magnetic recording medium using the recording head. In order to increase the recording density of the magnetic recording medium, it is effective to make the magnetic fine particles smaller.

When the magnetic fine particles are made smaller, however, there arises a problem that the magnetization thereof becomes unstable with respect to heat as the particles reduce in volume, thereby increasing the possibility that the data recorded on the magnetic recording medium is lost. To solve the problem, it is effective to increase the magnetic energy of the magnetic fine particles to thereby enhance the stability of magnetization. When the magnetic energy of the magnetic fine particles is increased, however, there arises another problem that the coercive force (difficulty in reversing magnetization) of the magnetic recording medium increases to deteriorate the data recording performance.

To solve such problems, a method called thermally assisted magnetic recording has been conventionally proposed. When recording data on a magnetic recording medium having a large coercive force, the thin-film magnetic head employing the thermally assisted magnetic recording (hereinafter, referred to as a "thermally assisted magnetic head") records data while instantaneously heating and thereby increasing the temperature of a portion of the magnetic recording medium where data will be recorded.

Since the magnetic fine particles decrease in coercive force when the temperature is increased, instantaneous heating makes it possible to record data even on the magnetic recording medium having a high coercive force at room temperature. The portion of the magnetic recording medium where the data has been recorded is decreased in temperature after the recording of data and thereby increases in coercive force. Therefore, by using the thermally assisted magnetic head, it becomes possible to make the magnetic fine particles finer as well as stabilize recording in the magnetic disk drive.

On the other hand, near-field light is used as means for heating the magnetic recording medium in the conventional thermally assisted magnetic head. When light enters an opening smaller than the wavelength of light, the light slightly seeps from the opening and locally exists near the opening. The light locally existing near the opening is called near-field light. The near-field light is confined in a region much smaller than that of a spot light obtained by collecting light using a lens, so that use of the near-field light makes it possible to heat only a limited extremely small recording region of the magnetic recording medium. A conventional technology concerning the thermally assisted magnetic recording is disclosed in, for example, US 2012-0155232 (also called patent document 1).

By the way, in the thermally assisted magnetic head, because the recording head is formed on the slider, the structure, which laser light for generating the near-field light is guided to the medium-opposing surface of the slider, is important. The two structures, indicated in the following a), b), are known as the structures.

a) the structure, which a light source is provided in the position distant from the slider, and laser light, emitted from the light source, is guided to the medium-opposing surface using a optical fiber, lens or the like (see for example, JP2002-298302 (also called patent document 2), WO98/09284 (also called patent document 3).

b) the structure, which the light source is provided on the side surface of the slider (for example, US2015-0364899 (also called patent document 4), US2011-0205661 (also called patent document 5), US2015-154988 (also called patent document 6), US 2015-0380035 (also called patent document 7), JP2012-084216 (also called patent document 8), JP2013-140671 (also called patent document 9), US2013-0279310 (also called patent document 10).

SUMMARY OF THE INVENTION

There are conventionally following problems in both thermally assisted magnetic head, having the structure indicated in the above a), and thermally assisted magnetic head, having the structure indicated in the above b). The problem is caused by optical feedback of a laser diode.

When laser light is emitted from the laser diode as the light source, part of laser light is reflected on the surface of the slider, after that, the reflected light returns to the laser diode as optical feedback. In this case, standing wave conditions collapse by mixing optical feedback, in the laser diode, unstable action, which is called 'mode hopping', which oscillation wavelength change suddenly, is caused. Thereby, an optical feedback noise by optical feedback, in addition to an inherent noise, is generated in the laser diode, optical output of the laser diode become unstable. Then, a recording characteristic of the thermally assisted magnetic head becomes unstable.

Therefore, the thermally assisted magnetic head, which an anti-reflection film is formed on a surface of a wave guide of the slider, is conventionally known, as disclosed in the patent document 9, the patent document 10.

However, the conventional anti-reflection film has the following problem. In case of the conventional thermally assisted magnetic head, a dielectric layer as a cladding layer is formed in the surrounding of the wave guide as a core layer.

However, the conventional anti-reflection film is effective for reducing the reflected light on the surface of the core layer, but it is not effective for reducing the reflected light on the surface of the cladding layer.

Therefore, in the conventional thermally assisted magnetic head, even if the anti-reflection film is formed, it is not able to reduce reflected light fully on the surface of the slider, and it is not able to stable the recording characteristic.

Hence the present invention is made to solve the above problem, and it is an object to reduce the reflected light fully and to stable the recording characteristic, in the thermally assisted magnetic head, the head gimbal assembly and the hard disk drive each having the thermally assisted magnetic head, and to provide a method for reducing reflected light for reducing the reflected light effectively.

To solve the above problem, the present invention is a thermally assisted magnetic head including: a slider; the slider includes a slider substrate and a magnetic head part formed on the slider substrate, the magnetic head part includes a medium-opposing surface opposing a magnetic recording medium, a light source-opposing surface arranged rear side of the medium-opposing surface, an anti-reflection film formed on the light source-opposing surface, a core layer which guides laser light from the light source-opposing surface to the medium-opposing surface and a cladding layer, made of a dielectric having the refractive index lower than the core layer, arranged in the surrounding of the core layer, the anti-reflection film includes a stacked structure which a first layer and a second layer are stacked, the second layer is formed with high refractive index dielectric having the refractive index higher than the first layer.

In case of the above-described thermally assisted magnetic head, the reflected light from the cladding layer is effectively reduced by the anti-reflection film having the stacked structure including the first layer and the second layer.

Further, it is possible that the second layer is formed on the light source-opposing surface and the first layer is formed on the second layer.

Further, it is possible that the anti-reflection film is formed with dielectrics which a dielectric-pattern, as a combination of dielectrics, is common with the core layer and the first layer.

It is possible that the first layer is formed with dielectric having the refractive index lower than the cladding layer.

Further, it is possible that the second layer is formed with tantalum oxide or titanium oxide, the first layer is formed with silicon dioxide.

Further, it is possible that the anti-reflection film reduces reflected light from the cladding layer than the first layer.

Further, the present invention provides a method for reducing reflected light of laser light used in the thermally assisted magnetic head, the thermally assisted magnetic head including: a slider; the slider includes a slider substrate and a magnetic head part formed on the slider substrate, the magnetic head part includes a medium-opposing surface opposing a magnetic recording medium, a light source-opposing surface arranged rear side of the medium-opposing surface, a core layer which guides laser light from the light source-opposing surface to the medium-opposing surface and a cladding layer, made of a dielectric having the refractive index lower than the core layer, arranged in the surrounding of the core layer, a first layer and a second layer, formed with high refractive index dielectric having the refractive index higher than the first layer, are stacked on the light source-opposing surface to reduce the reflected light from the cladding layer, than the case which the only first layer is formed on the light source-opposing surface.

Further, it is possible that the second layer is formed on the light source-opposing surface and the first layer is formed on the second layer.

Further, it is also possible that the second layer and the first layer are formed with dielectrics which a dielectric-pattern, as a combination of dielectrics, is common with the core layer and the first layer.

Further, the present invention provides a head gimbal assembly including a thermally assisted magnetic head, the thermally assisted magnetic head including: a slider; the slider comprises a slider substrate and a magnetic head part formed on the slider substrate, the magnetic head part comprises a medium-opposing surface opposing a magnetic recording medium, a light source-opposing surface arranged rear side of the medium-opposing surface, an anti-reflection film formed on the light source-opposing surface, a core layer which guides laser light from the light source-opposing surface to the medium-opposing surface and a cladding layer, made of a dielectric having the refractive index lower than the core layer, arranged in the surrounding of the core layer, the anti-reflection film includes a stacked structure which a first layer and a second layer are stacked, the second layer is formed with high refractive index dielectric having the refractive index higher than the first layer.

Further, the present invention provides a hard disk drive comprising a head gimbal assembly having a thermally assisted magnetic head, and a magnetic recording medium opposing the thermally assisted magnetic head, the thermally assisted magnetic head including: a slider; the slider comprises a slider substrate and a magnetic head part formed on the slider substrate, the magnetic head part comprises a medium-opposing surface opposing a magnetic recording medium, a light source-opposing surface arranged rear side of the medium-opposing surface, an anti-reflection film formed on the light source-opposing surface, a core layer which guides laser light from the light source-opposing surface to the medium-opposing surface and a cladding layer, made of a dielectric having the refractive index lower than the core layer, arranged in the surrounding of the core layer, the anti-reflection film includes a stacked structure which a first layer and a second layer are stacked, the second layer is formed with high refractive index dielectric having the refractive index higher than the first layer.

The present invention will be more fully understood from the detailed description given hereinbelow and the accompanying drawings which are given by way of illustration only, and thus are not to be considered as limiting the present invention.

BRIEF DESCRIPTION OF THE DRAWINGS

FIG. 9 is a view respectively illustrating reflection rate from a core layer, a cladding layer, in case of no anti-reflection film, with anti-reflection film;

and

FIG. 19 is a view illustrating example of materials and film-thickness of the anti-reflection film, being able to reduce effectively the reflected light from the core layer, the reflected light from the cladding layer.

DETAILED DESCRIPTION OF THE EMBODIMENTS

In the following, embodiments of the present invention will be described with reference to the drawings. Note that the same components will be referred to with the same numerals or letters, while omitting their overlapping descriptions.

(Structure of the Thermally Assisted Magnetic Head)

Figure 1:
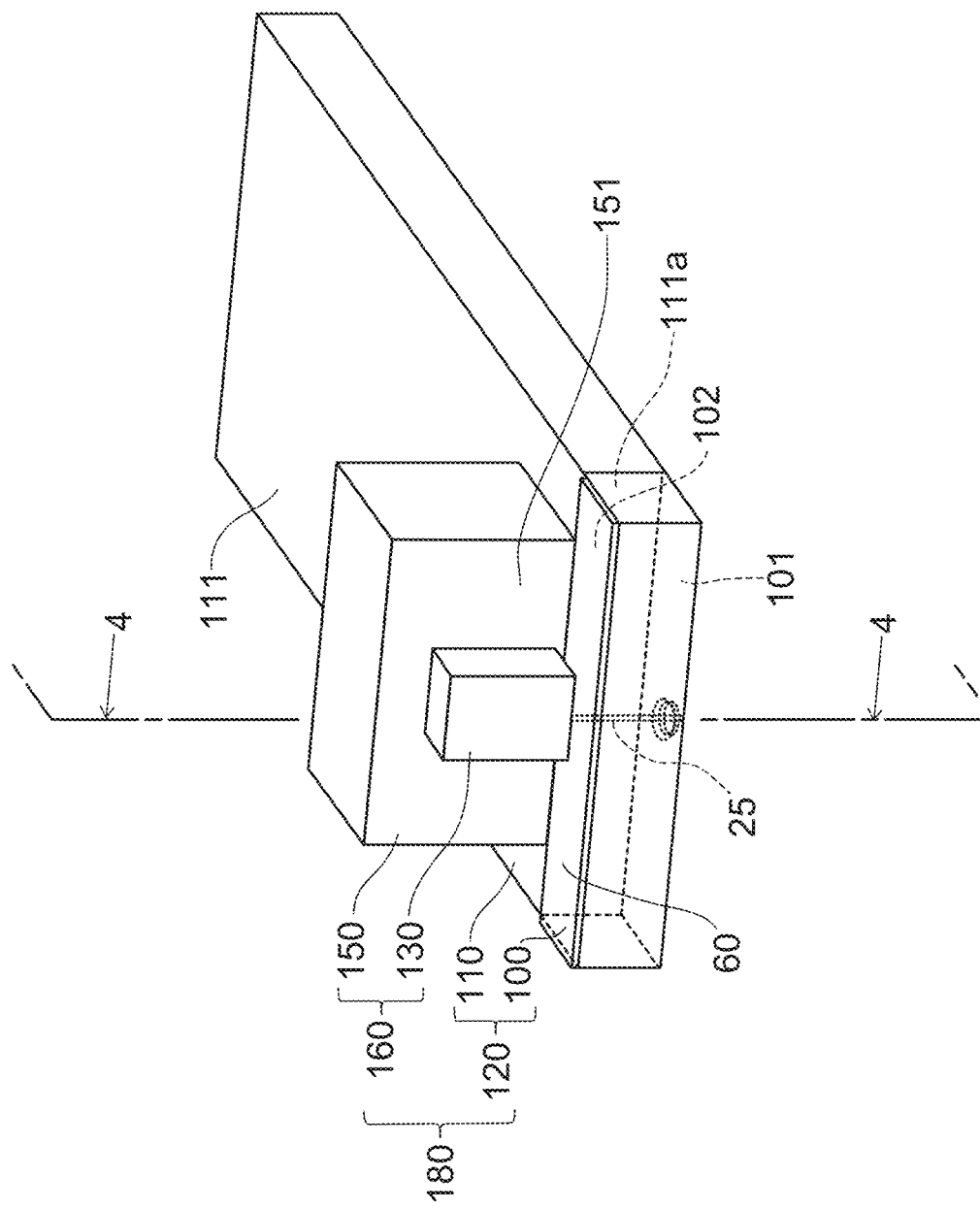
FIG. 1 is a perspective view of the thermally assisted magnetic head according to an embodiment of the present invention.
Figure 2:
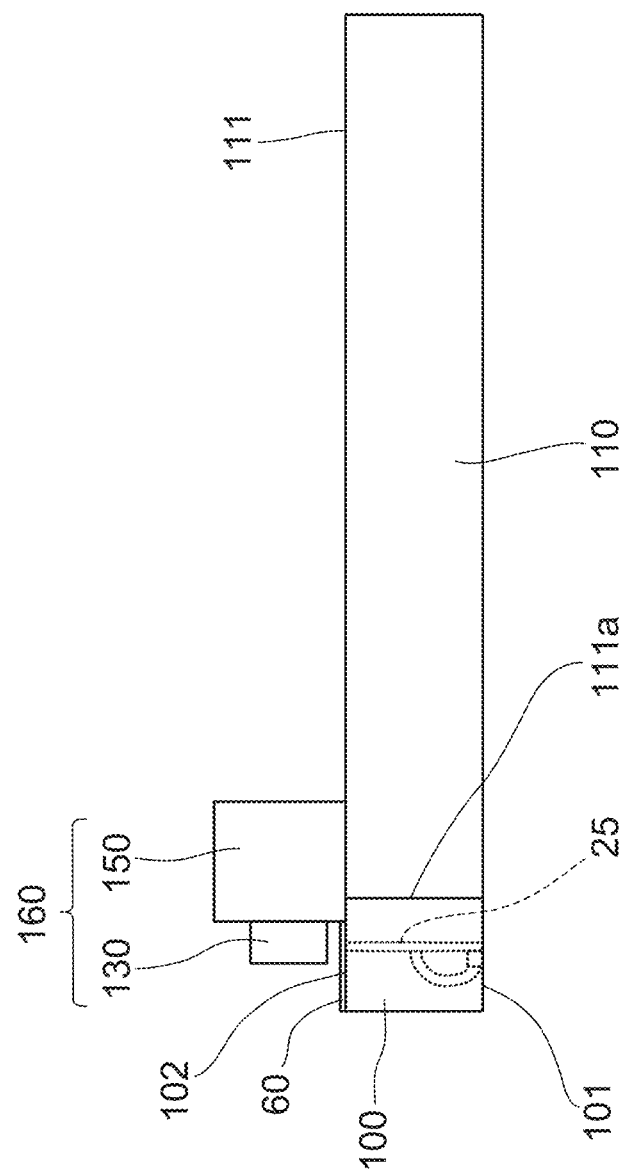
FIG. 2 is a side view of the thermally assisted magnetic head according to the embodiment of the present invention.
Figure 3:
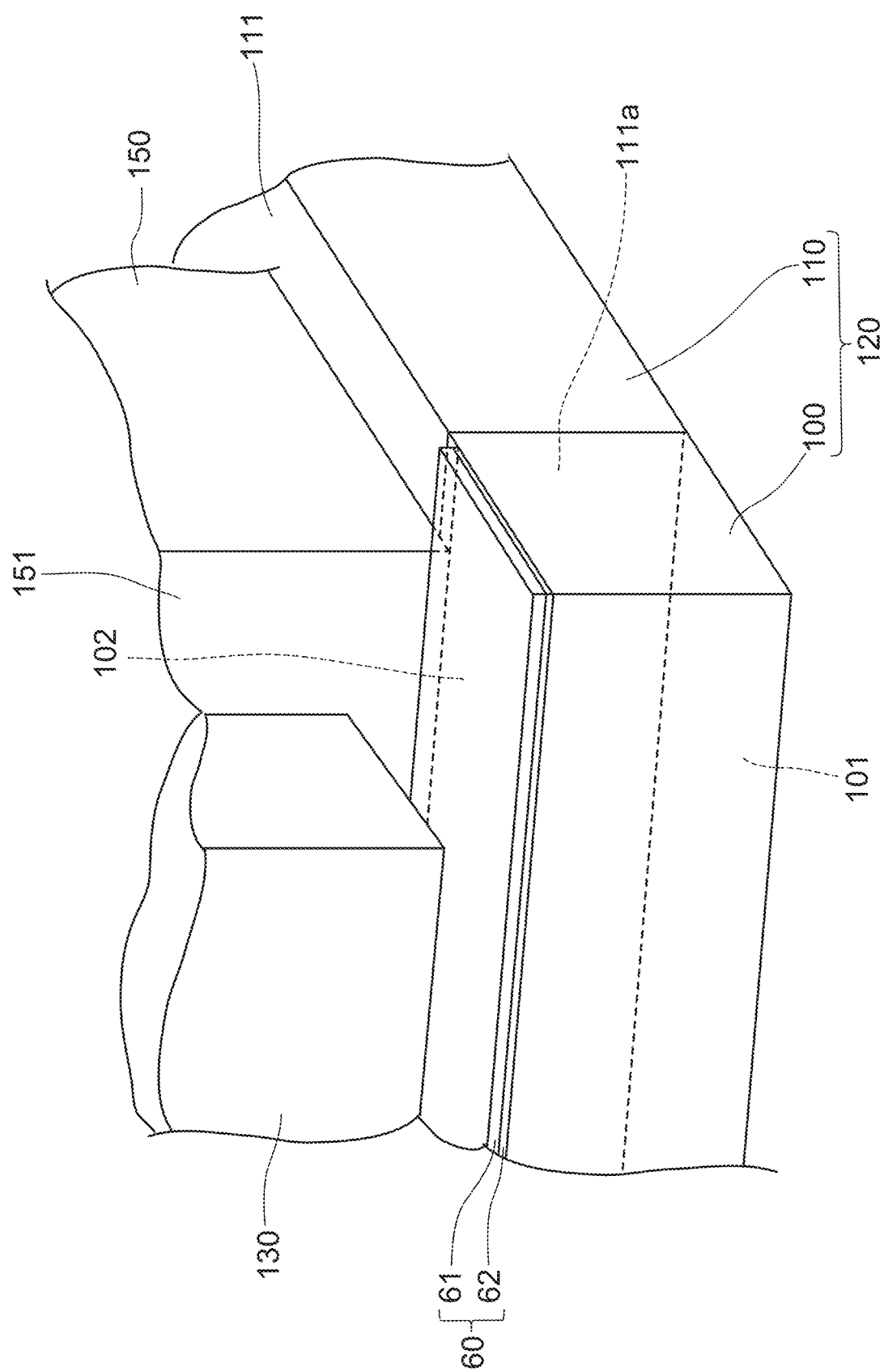
FIG. 3 is a perspective view, with enlargement, of the principal part of the thermally assisted magnetic head.
Figure 4:
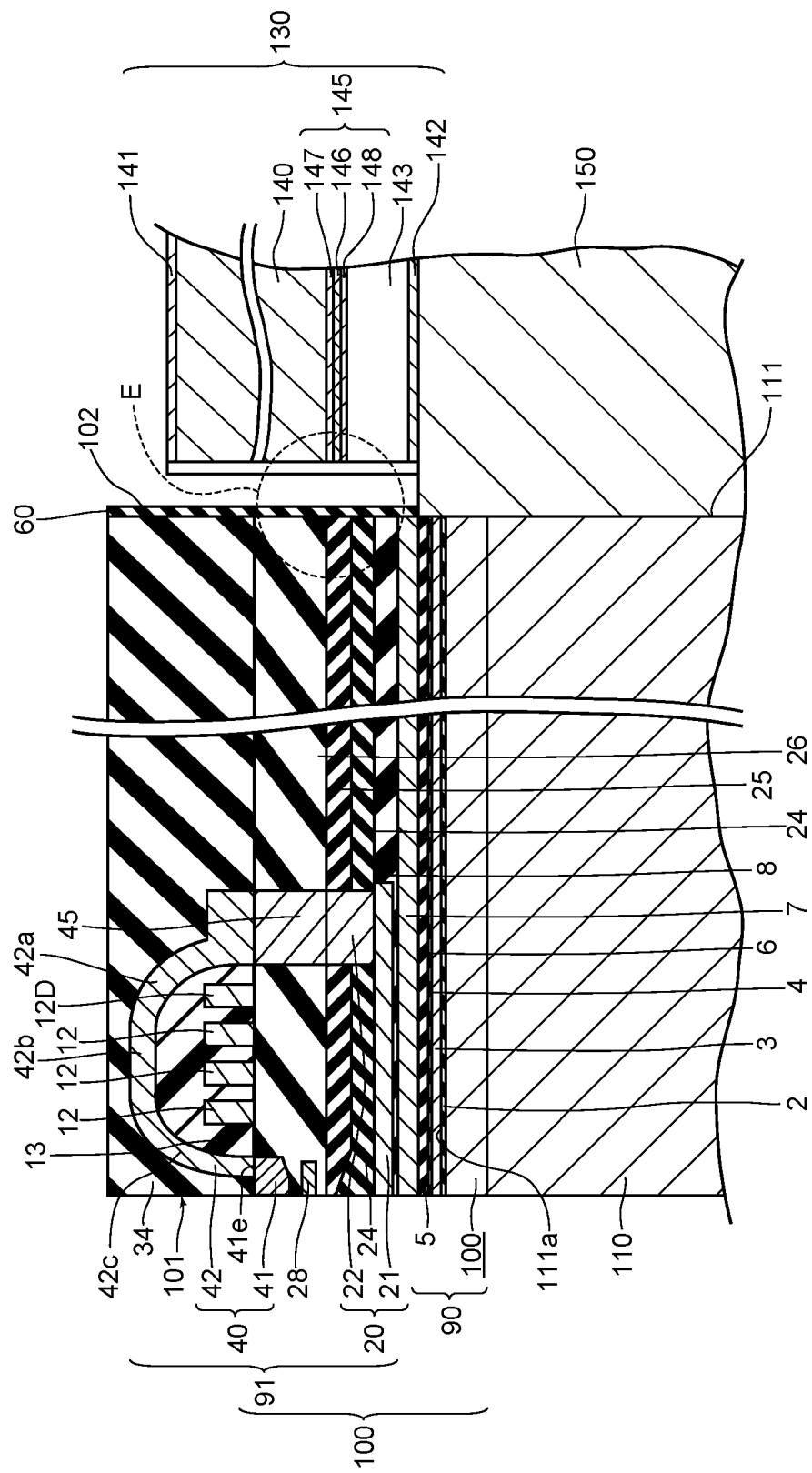
FIG. 4 is a sectional view of the principal part taken along the line 4-4 in FIG. 1.
Figure 5:
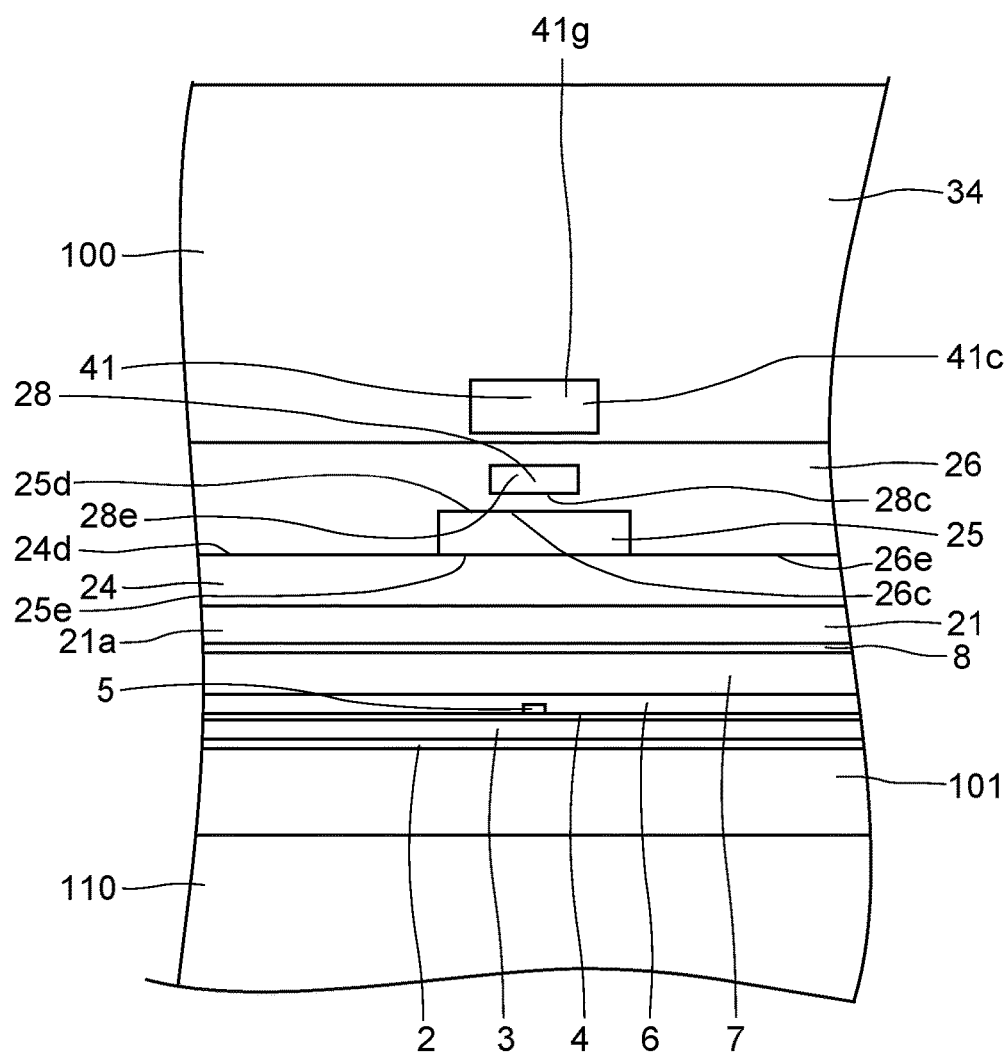
FIG. 5 is a front view illustrating an ABS of a magnetic head part.
Figure 6:
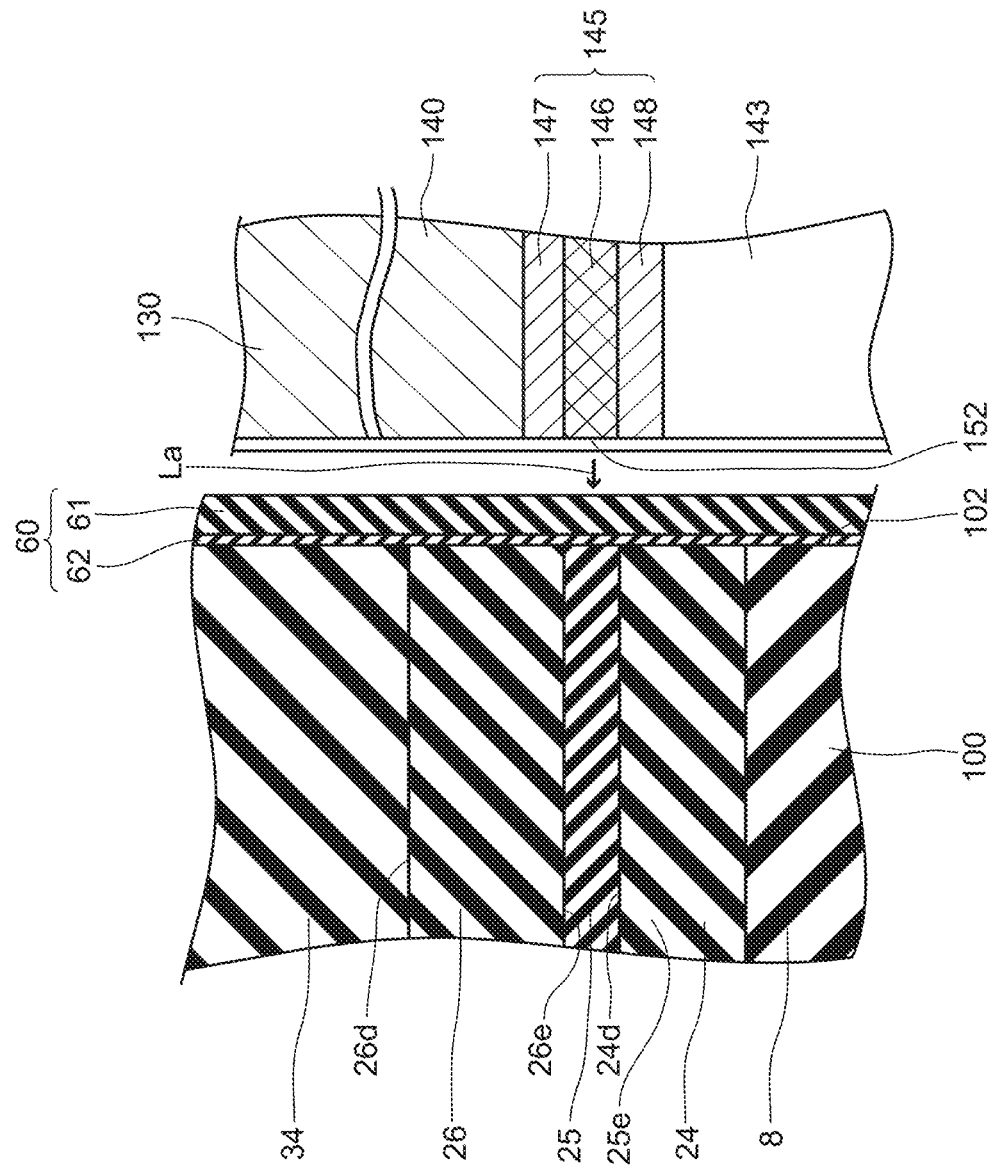
FIG. 6 is a sectional view showing a part indicated by E in FIG. 4.

To begin with, structure of the thermally assisted magnetic head according to the embodiment of the present invention will be explained with reference to FIG. 1 to FIG. 6. Here, FIG. 1 is a perspective view of the thermally assisted magnetic head 180 according to the embodiment of the present invention, FIG. 2 is a side view of the thermally assisted magnetic head 180 according to the embodiment of the present invention, FIG. 3 is a perspective view, with enlargement, of the principal part of the thermally assisted magnetic head 180. FIG. 4 is a sectional view of principal part taken along the line 4-4 in FIG. 1, FIG. 5 is a front view illustrating a medium opposing surface (Air Bearing Surface, which will hereinafter be referred also to as "ABS") 101 of the magnetic head part 100, FIG. 6 is a sectional view illustrating a part indicated by E in FIG. 4.

The thermally assisted magnetic head 180 has a slider 120 and a light source-unit 160 joined to the slider 120. The thermally assisted magnetic head 180 has a complex-slider-structure which the slider 120 is joined to the light source-unit 160.

The slider 120 has a slider-substrate 110 and the magnetic head part 100 formed on the slider-substrate 110.

The slider-substrate 110 is made of a ceramic material such as aluminum oxide-titanium carbide ($Al_2O_3.TiC$) or the like, and it is formed in a rectangular parallelepiped shape. The slider-substrate 110 has the ABS 101 as the medium opposing surface, opposing to the magnetic recording medium, a light source placing surface 111, arranged in the rear side of the ABS 101. A part, of the light source placing surface 111, of the magnetic head part 100 side is a light source-opposing surface 102. The light source-opposing surface 102 opposes to a laser diode 130 of the later-described light source-unit 160. A later-described anti-reflection film 60 is formed on the light source-opposing surface 102.

In the thermally assisted magnetic head 180, because the anti-reflection film 60 is formed on the light source-opposing surface 102, optical feedback noise is fully reduced and a stabilization of recording characteristic is realized.

(Magnetic Head Part)

Subsequently, the magnetic head part 100 will be explained with mainly reference to FIG. 4 to FIG. 6. The magnetic head part 100 has a reproducing head 90 and a recording head 91. The magnetic head part 100 has a structure which the reproducing head 90 and the recording head 91 are stacked.

The reproducing head 90 has an MR device 5, arranged near the ABS 101, for detecting a magnetic signal. The reproducing head 90 comprises a lower shield layer 3, a lower shield gap film 4, an upper shield gap film 6 and an upper shield layer 7.

Then, an insulating layer 2 is further formed on a thin-film laminated surface 111a of the slider-substrate 110, and the lower shield layer 3 made of a magnetic material is formed on the insulating layer 2. The lower shield gap film 4 as an insulating film is further formed on the lower shield layer 3, and the upper shield gap film 6 shielding the MR device 5 is formed on the lower shield gap film 4. The upper shield layer 7 made of a magnetic material is formed on the upper shield gap film 6, and an insulating layer 8 is formed on the upper shield layer 7.

The MR device 5 is constituted by a magnetosensitive film exhibiting a magnetoresistive effect, such as AMR (anisotropic magnetoresistive), GMR (giant magnetoresistive), and TMR (tunneling magnetoresistive) devices.

The recording head 91 has a thin-film coil 12, a return magnetic layer 20, a core layer 25, a lower dielectric-layer 24, an upper dielectric-layer 26, a near-field light generating layer 28, an overcoat layer 34, a main magnetic pole layer 40, and a linking magnetic pole layer 45, and has a structure in which they are stacked on the thin-film laminated surface 111a.

The thin-film coil 12 has four turn parts. The thin-film coil 12 is wound like a flat spiral about a later-described yoke magnetic pole layer 42 of the main magnetic pole layer 40.

The four turn parts are arranged at respective positions having different distances from the ABS 101. Among them, the turn part 12D is a part arranged at a position most distant from the ABS 101 among the four turn parts of the thin-film coil 12. The four turn parts are insulated from each other by a photoresist 13.

When a current modulated according to data to be recorded on the magnetic recording medium flows through the thin-film coil 12, the current causes the thin-film coil 12 to generate a recording magnetic field.

The return magnetic pole layer 20 has a connecting magnetic pole layer 21, and a rear magnetic pole layer 22.

The connecting magnetic pole layer 21 has a magnetic pole end face 21a arranged within the ABS 101 and has a portion that is more distant from the ABS 101 than is the magnetic pole end face 21a being embedded in the insulating layer 8. The connecting magnetic pole layer 21 has a size reaching a position more distant from the ABS 101 than is the turn part 12D. To the connecting magnetic pole layer 21, the rear magnetic pole layer 22 is joined at a position more distant from the ABS 101 than is the turn part 12D.

The rear magnetic pole layer 22 is arranged at a position more distant from the ABS 101 than is the turn part 12D, and is joined to the connecting magnetic pole layer 21 and the later-described linking magnetic pole layer 45.

The return magnetic pole layer 20 is provided to return a magnetic flux to the main magnetic pole layer 40. When a magnetic flux generated by the recording magnetic field is emitted from a later-described magnetic pole end face 41g of the main magnetic pole layer 40 to the magnetic recording medium, the magnetic flux flows back to the return magnetic pole layer 20 via the magnetic recording medium (a not-depicted soft magnetic layer in detail). This magnetic flux passes through the linking magnetic pole layer 45 and reaches the main magnetic pole layer 40.

The core layer 25 is a wave guide which guides laser light, generated by the later-described laser diode 130 of the light source-unit 160, from the light source-opposing surface 102 to the ABS 101. The core layer 25, as illustrated in FIG. 4, is formed along with a depth direction, passing through between the linking magnetic pole layer 45, from the ABS 101 to the light source-opposing surface 102.

The core layer 25 is formed with dielectric such as tantalum oxide ($TaO_x$) or the like. For example, the core layer 25 is able to be formed with $Ta_2O_5$ (for example, the refractive index is about 2.16).

The core layer 25 is formed so as to be accommodated in a later-described concave part 26c of the upper dielectric-layer 26, on an upper surface 24d of the lower dielectric-layer 24. Further, an upper surface 25d and both side surfaces, of the core layer 25, are in contact with the upper dielectric-layer 26, and a lower surface 25e, of the core layer 25, is in contact with the lower dielectric-layer 24.

Then, the upper dielectric-layer 26 and the lower dielectric-layer 24 are arranged in the surrounding of the core layer 25, the cladding layer is constituted by the upper dielectric-layer 26 and the lower dielectric-layer 24.

The upper dielectric-layer 26 is formed in a substantially flat plate shape having a width larger than the width of the magnetic pole end part layer 41. The upper dielectric-layer 26 is formed with dielectric, having the lower refractive index than the core layer 25, for example, such as aluminum oxide ($AlO_x$) or the like. For example, the upper dielectric-layer 26 is able to be formed with alumina ($Al_2O_3$, for example, the refractive index is about 1.63). Then, the concave part 26c is formed on the lower surface 26e of the upper dielectric-layer 26, the core layer 25 is accommodated in the concave part 26c.

The lower dielectric-layer 24 is formed so as to be in contact with the lower surface 25e of the core layer 25 and the lower surface 26e of the upper dielectric-layer 26. The lower dielectric-layer 24 is able to be formed with dielectric such as aluminum oxide ($AlO_x$) or the like, similar with the upper dielectric-layer 26.

For example, the lower dielectric-layer 24 is able to be formed with alumina ($Al_2O_3$).

The near-field light generating layer 28 has a structure formed in a rectangular shape as a whole, seen from the ABS 101.

The near-field light generating layer 28 is made of metal and formed of, for example, one of Au, Ag, Al, Cu, Pd, Pt, Rh, Jr or an alloy made of a plurality of those elements.

The near-field light generating layer 28 has a bottom part 28c. The bottom part 28c is arranged at the deepest positions of the near-field light generating layer 28. The bottom part 28c extends from the ABS 101 in the depth direction. The end surface of the bottom part 28c on the ABS 101 side is arranged within the ABS 101. This end surface is a generating end part 28e. The generating end part 28e generates near-field light for heating the magnetic recording medium.

The main magnetic pole layer 40 has the magnetic pole end part layer 41 and the yoke magnetic pole layer 42. The magnetic pole end part layer 41 and the yoke magnetic pole layer 42 have a symmetrical structure formed to be bilaterally symmetrical about a later-described front end part 41c.

The front surface including the front end part 41c constitutes the magnetic pole end surface 41g. The magnetic pole end surface 41g is arranged within the ABS 101. The front end part 41c is in direct contact with the generating end part 28e of the near-field light generating layer 28 from the front side. The yoke magnetic pole layer 42 is joined to an upper surface 41e of the magnetic pole end part layer 41.

The yoke magnetic pole layer 42 has a rear magnetic pole layer 42a, a middle magnetic pole layer 42b, and a front magnetic pole layer 42c. The yoke magnetic pole layer 42 has a curved structure extending from the ABS 101 in the depth direction and leading to the linking magnetic pole layer 45 straddling the thin-film coil 12.

The rear magnetic pole layer 42a is arranged at a position more distant from the ABS 101 than are the four turn parts of the thin-film coil 12. The rear magnetic pole layer 42a has a lateral width larger than that of the middle magnetic pole layer 42b (the largest lateral width in the yoke magnetic pole layer 42) and is joined to the linking magnetic pole layer 45. The middle magnetic pole layer 42b is arranged above the thin-film coil 12. The middle magnetic pole layer 42b is connected to the rear magnetic pole layer 42a and the front magnetic pole layer 42c. The middle magnetic pole layer 42b has a lateral width gradually getting smaller as it approaches to the ABS 101. The front magnetic pole layer 42c is formed in a downward curved structure getting closer to the magnetic pole end part layer 41 as it approaches to the ABS 101. The front magnetic pole layer 42c is joined to the front surface 41e of the magnetic pole end part layer 41.

The linking magnetic pole layer 45 is arranged in a manner to hold the core layer 25 from both right and left sides at a position more distant from the ABS 101 than is the thin-film coil 12. Further, the linking magnetic pole layer 45 is joined to the rear magnetic pole layer 22.

The linking magnetic pole layer 45 magnetically links the return magnetic pole layer 20 to the main magnetic pole layer 40, and has a role of returning, to the main magnetic pole layer 40, the magnetic flux flown back to the return magnetic pole layer 20.

(Light Source-Unit)

Subsequently, the light source-unit 160 will be explained with mainly reference to FIG. 1 to FIG. 4. The light source-unit 160 has the laser diode 130 and a sub-mount 150.

The laser diode 130 has an n-substrate 140, an n-electrode 141, a light emitting layer 145, and a p-electrode 142, and has a rectangle parallelepiped shape, as illustrated in FIG. 4. In addition, the n-electrode 141 is joined on a surface on the outside of the n-substrate 140. Further, the light emitting layer 145 is formed on a side of the n-substrate 140 opposite to the n-electrode 141, and the p-electrode 142 is joined on the light emitting layer 145, via a ground layer 143.

The light emitting layer 145 has an active layer 146, an n-cladding layer 147, and a p-cladding layer 148, and has a structure in which the active layer 146 is sandwiched between the n-cladding layer 147 and the p-cladding layer 148.

Then, the laser diode 130 is joined to the sub-mount 150 so that the active layer 146 opposes to the core layer 25 via the anti-reflection film 60, and an emitting part 152 is arranged in a part, of the light emitting layer 145, opposing to the core layer 25. The emitting part 152 is a part, of the laser diode 130, which emits the laser light La.

The sub-mount 150 is made of a ceramic material such as aluminum oxide-titanium carbide ($Al_2O_3.TiC$) or the like, and is formed in a rectangular parallelepiped shape. The sub-mount 150 has a size larger than the laser diode 130. Further, the sub-mount 150 is able to be formed with semiconductor material such as Si, GaAs, SiC or the like.

The sub-mount 150 is joined on the light source placing surface 111 of the slider-substrate 110, and the laser diode 130 is joined on a laser fixing surface 151 intersecting with the junction surface.

(Anti-Reflection Film)

Figure 7:
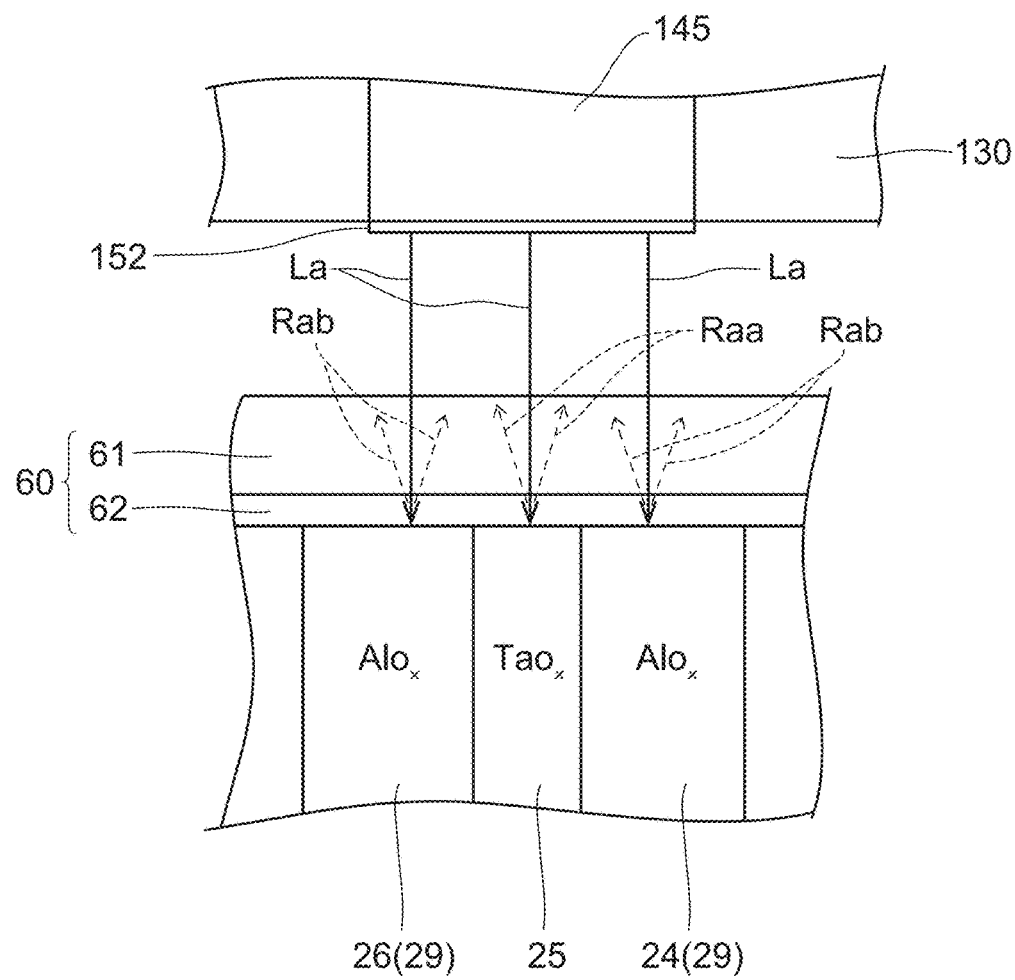
FIG. 7 is a view illustrating principal parts of a laser diode, an anti-reflection film having a stacked structure, the magnetic head part.
Figure 8:
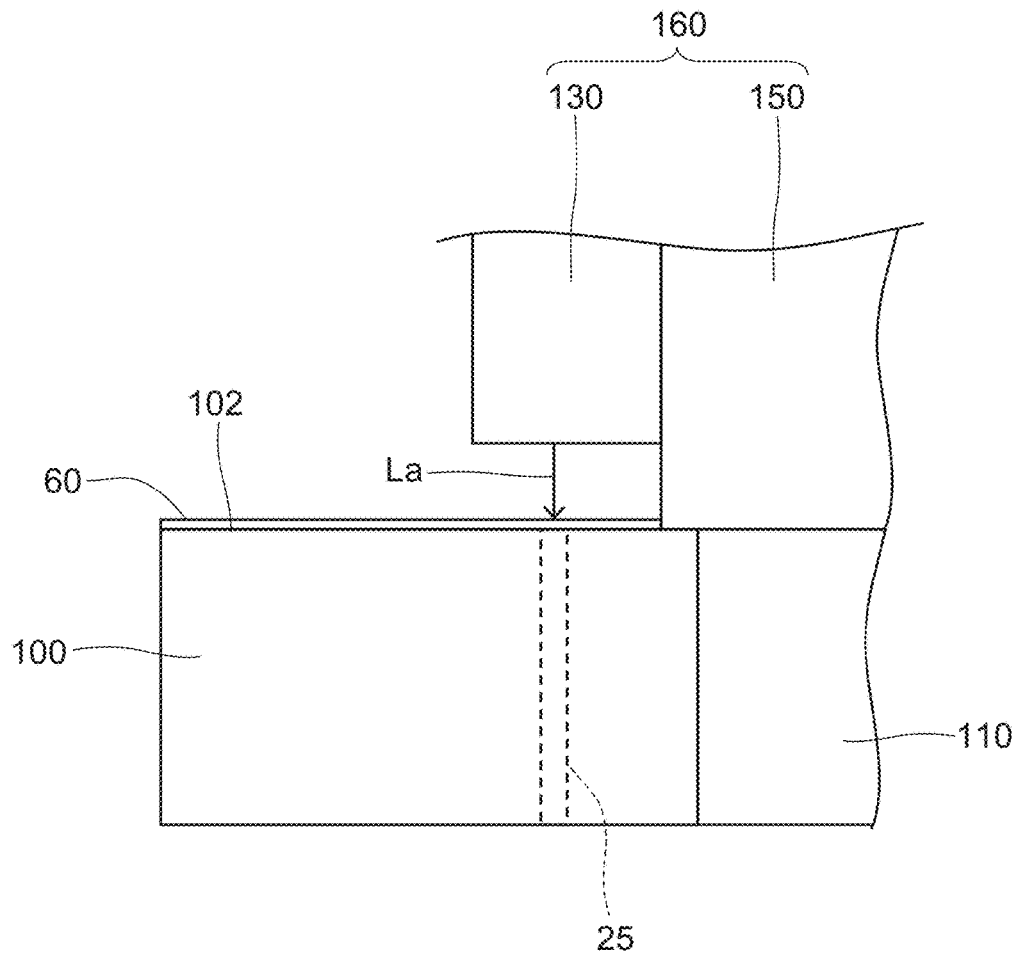
FIG. 8 is a side view illustrating principal parts of the magnetic head part and a light source-unit.

Next, the anti-reflection film 60 will be explained with mainly reference to FIG. 1, 3, 7. As illustrated in FIGS. 1, 3, 7, the anti-reflection film 60 is formed on the light source-opposing surface 102. The anti-reflection film 60 has a stacked structure which a first layer 61 and a second layer 62 are stacked.

The first layer 61 is formed on the second layer 62. Note that the upper dielectric-layer 26 and lower dielectric-layer 24 are also called, "cladding layer 29". Further, reflected light from the core layer 25 also called, "core-reflected light". The second layer 62 is formed with dielectric having the refractive index higher than the first layer 61 (also called high refractive index dielectric).

In the thermally assisted magnetic head 180, the anti-reflection film 60, having the stacked structure, is formed on the light source-opposing surface 102. Thereby, in the thermally assisted magnetic head 180, reflected light from the cladding layer 29 (also called, "cladding-reflected light") is largely, effectively reduced than the case which the later-described anti-reflection film 260 is formed on the light source-opposing surface 102. This is a characteristic of the thermally assisted magnetic head 180.

Figure 11:
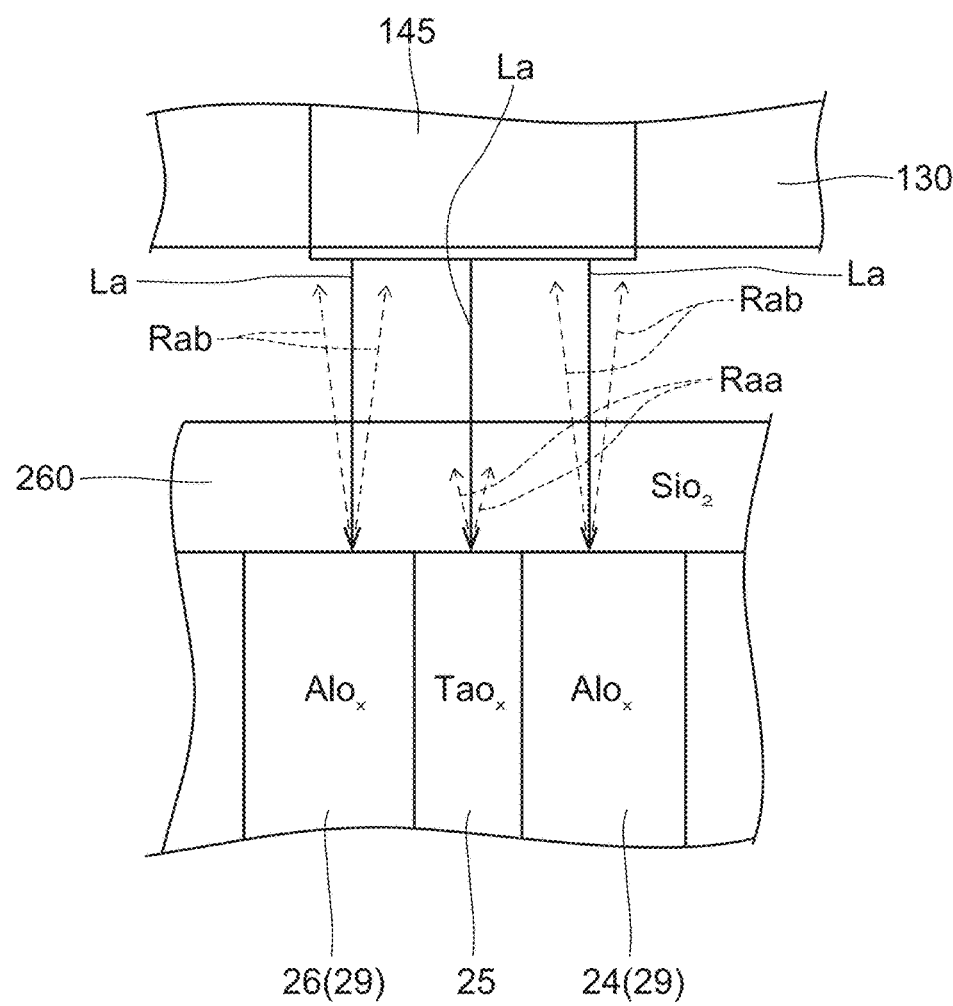
FIG. 11 is a view illustrating principal parts of the laser diode, the anti-reflection film having a single-layer structure, the magnetic head part.

For explaining the characteristic, as illustrated in FIG. 11, the case, which the anti-reflection film 260 is formed on the light source-opposing surface 102, will be explained. The anti-reflection film 260 has a single layer structure (film thickness is about 140 nm), made of silicon oxide ($SiO_2$).

Then, when the laser light La is emitted from the light emitting layer 145, part of it reflects on the surface of the anti-reflection film 260, the surface of the core layer 25, the surface of cladding layer 29, and it returns to the light emitting layer 145 as an optical feedback. In this case, the core-reflected light Raa and the cladding-reflected light Rab are included in the optical feedback.

The reflection rate of the core-reflected light Raa is decided by interference in the reflected light on the surface of the anti-reflection film 260 and the reflected light on the surface of the core layer 25. The reflection rate of the core-reflected light Raa is about 0.03%. The reflection rate of the cladding-reflected light Rab is decided by interference in the reflected light on the surface of the anti-reflection film 260 and the reflected light on the surface of the cladding layer 29. The reflection rate of the cladding-reflected light Rab is about 0.92%.

Therefore, the anti-reflection film 260 reduces the core-reflected light Raa than the cladding-reflected light Rab. The anti-reflection film 260 has a function which reduces effectively the core-reflected light Raa.

However, because the reflection rate of the cladding-reflected light Rab is about 0.92%, the anti-reflection film 260 is not able to reduce effectively the cladding-reflected light Rab.

On the other hand, the case, which the anti-reflection film 60 is formed, is following. The first layer 61 is able to be formed with silicon oxide ($SiO_2$, for example, the refractive index is about 1.46) similar with the anti-reflection film 260. The first layer 61 is formed with dielectric having lower refractive index than the cladding layer 29. Further, for example, the thickness of the first layer 61 is able to be about 148 nm.

The second layer 62 is able to be formed with tantalum oxide ($TaO_x$), for example. Concretely, the second layer 62 is able to be formed with $Ta_2O_5$. Further, the thickness of the second layer 62 is able to be about 51 nm.

Then, in case of FIG. 7, when the laser light La is emitted from the light emitting layer 145, part of it also reflects on the surface of the anti-reflection film 60, the surface of the core layer 25, the surface of cladding layer 29, and it also returns to the light emitting layer 145 as the optical feedback. In this case, the core-reflected light Raa and the cladding-reflected light Rab are also included in the optical feedback.

In the case which the anti-reflection film 60 is formed, the reflection rate of the core-reflected light Raa is decided by interference in the reflected light on the surface of the first layer 61, the reflected light on the surface of the second layer 62 and the reflected light on the surface of the core layer 25. In this case, because condition of interference changes by addition of the reflected light on the surface of the second layer 62, the reflection rate of the core-reflected light Raa becomes about 0.23%, it becomes little larger than the case which the anti-reflection film 260 is formed.

On the other hand, the reflection rate of the cladding-reflected light Rab is decided by interference in the reflected light on the surface of the first layer 61, the reflected light on the surface of the second layer 62 and the reflected light on the surface of the cladding layer 29. The reflection rate of the cladding-reflected light Rab of this case decreases to about 0.14%.

Because, the first layer 61 is a layer made of silicon oxide ($SiO_2$) similar with the anti-reflection film 260, it has a function which reduces effectively the core-reflected light Raa.

In general, there is a substrate made of dielectric, and dielectric film, having lower reflection index than the substrate, is formed on the surface of the substrate, it brings a reduction of a reflection rate. Arrangement of the combination of dielectrics, which are stacked, brings reducing effect of reflected light. Then, when the anti-reflection film 260 is formed, because the anti-reflection film 260, made of $SiO_2$, is formed on the surface of the core layer 25, made of $TaO_x$, effective reduction effect of reflected light is obtained by the combination of the dielectric of the anti-reflection film 260 and the dielectric of the core layer 25, namely $SiO_2/TaO_x$. In this embodiment, the combination of the dielectrics, which brings effective reducing effect of reflected light, is also called a dielectric-pattern.

Then, when the second layer 62 is formed on the light source-opposing surface 102, the first layer 61 is formed on the second layer 62, the dielectric-pattern (SiO$_2$/TaO$_x$), common with the case of the anti-reflection film 260, is formed by the first layer 61 and the second layer 62. Therefore, in the anti-reflection film 60, effective reducing effect of reflected light is exhibited by the dielectric-pattern.

Therefore, in the anti-reflection film 60, the cladding-reflected light Rab is effectively reduced. Namely, the cladding-reflected light Rab, which is not reduced effectively by only the first layer 61, is effectively reduced by the anti-reflection film 60 having the stacked structure including the second layer 62. Therefore, the anti-reflection film 60 is able to reduce not only the core-reflected light Raa but also the cladding-reflected light Rab.

Accordingly, optical feedback is reduced effectively by forming of the anti-reflection film 60 on the light source-opposing surface 102. Therefore, optical output of the laser diode 130 becomes stable. Accordingly, recording characteristic of the thermally assisted magnetic head 180 becomes stable.

Here, FIG. 9 is a plan view illustrating respective reflection rate of the core-reflected light, a cladding-reflected light, in case of no anti-reflection film, with anti-reflection film. In FIG. 9, (a) is the case which anti-reflection film is not formed, (b) is the case which the anti-reflection film 260 is formed, (c) is the case which the anti-reflection film 60 is formed, (d) is the case which the later-described anti-reflection film 70 is formed.

As illustrated in FIG. 9, in the case which the anti-reflection film is formed, reflection rate is largely reduced in comparison with the case which the anti-reflection film is not formed. However, in case of the anti-reflection film 260, reflection rate of the cladding-reflected light is larger than the core-reflected light, therefore, the cladding-reflected light is not effectively reduced. On the other hand, in the case which the anti-reflection film 60 is formed, in the case which the anti-reflection film 70 is formed, the difference between the core-reflected light and the cladding-reflected light is small, a balance of both is kept. Because both the case which the anti-reflection film 60 is formed and the case which the anti-reflection film 70 is formed, reflection rate is effectively reduced in comparison with the case which the anti-reflection film 260 is formed, reflected light is effectively reduced.

(Influence on the Recording Characteristic)

Figure 12:
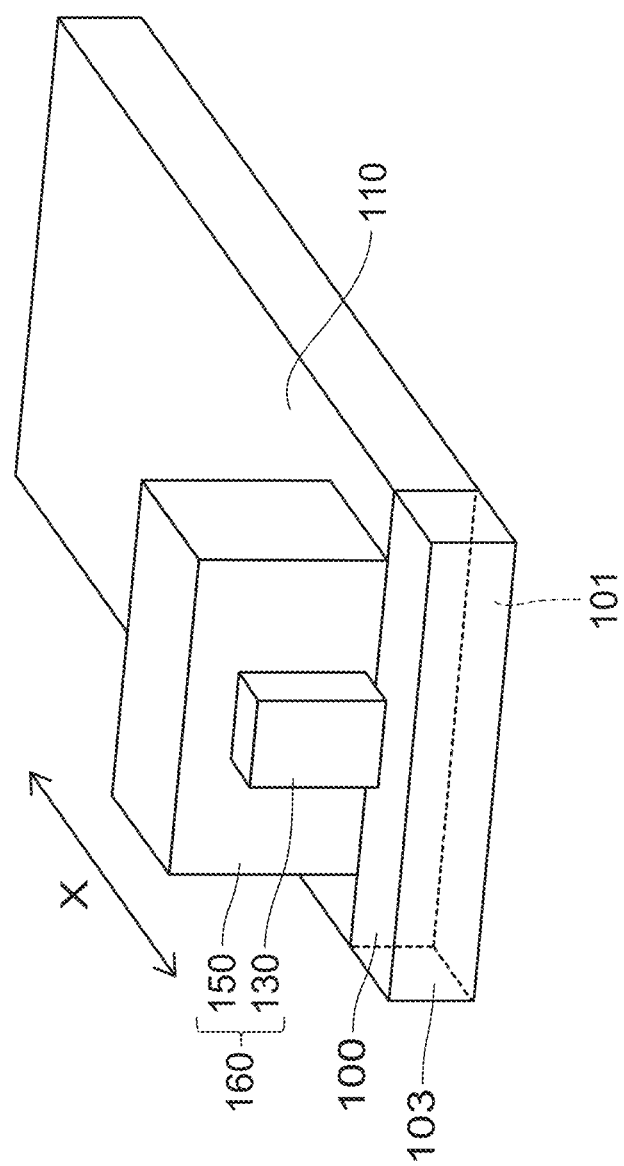
FIG. 12 is a side view illustrating a direction which a joined position of the light source-unit is changed.

Here, inventors of the present invention performed following experiments for checking the influence on the recording characteristic by the reflected light of the laser light. As illustrated in FIG. 12, junction position of the light source-unit 160 on the slider-substrate 110 is moved along with X direction. When edge-surface, of the slider-substrate 110, intersecting the ABS 101 is a front end-surface 103, X direction is a direction intersecting the front end-surface 103.

Figure 13:
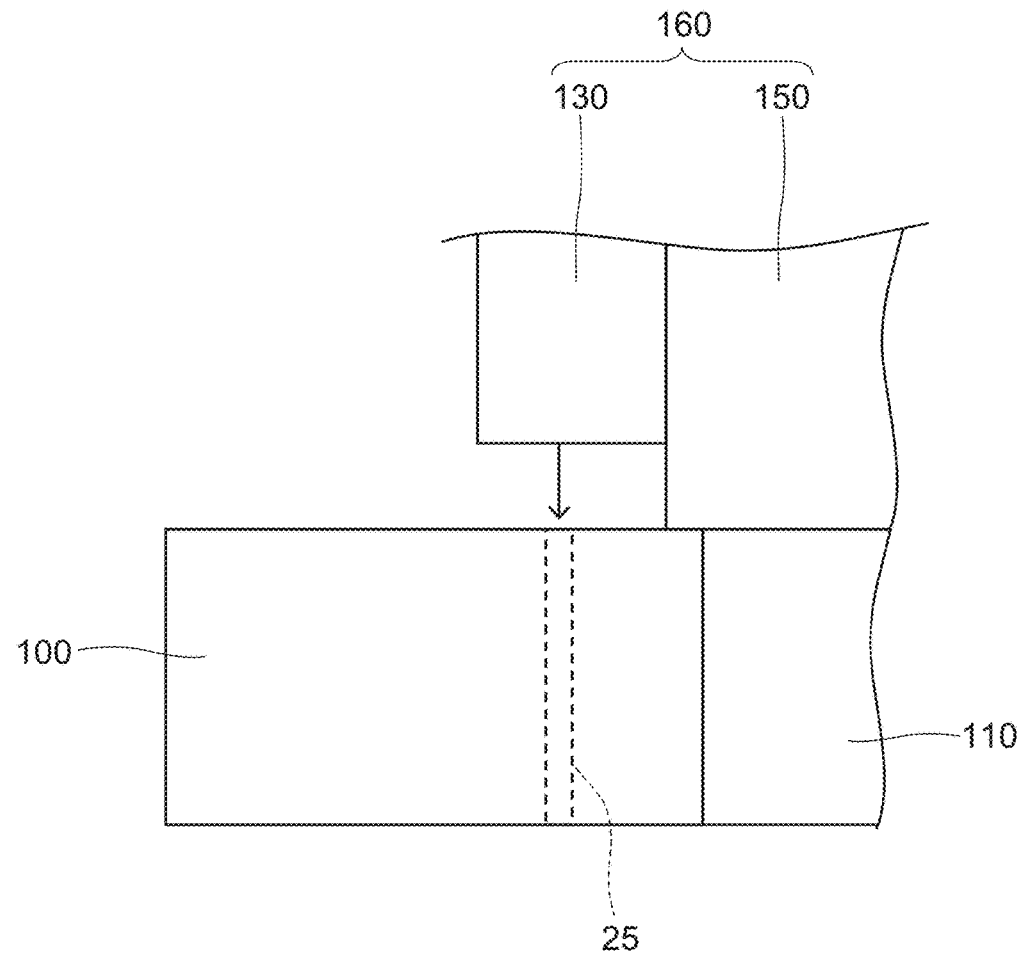
FIG. 13 is a side view illustrating principal parts of the magnetic head part and the light source-unit when the light source-unit is joined at the right position.
Figure 14:
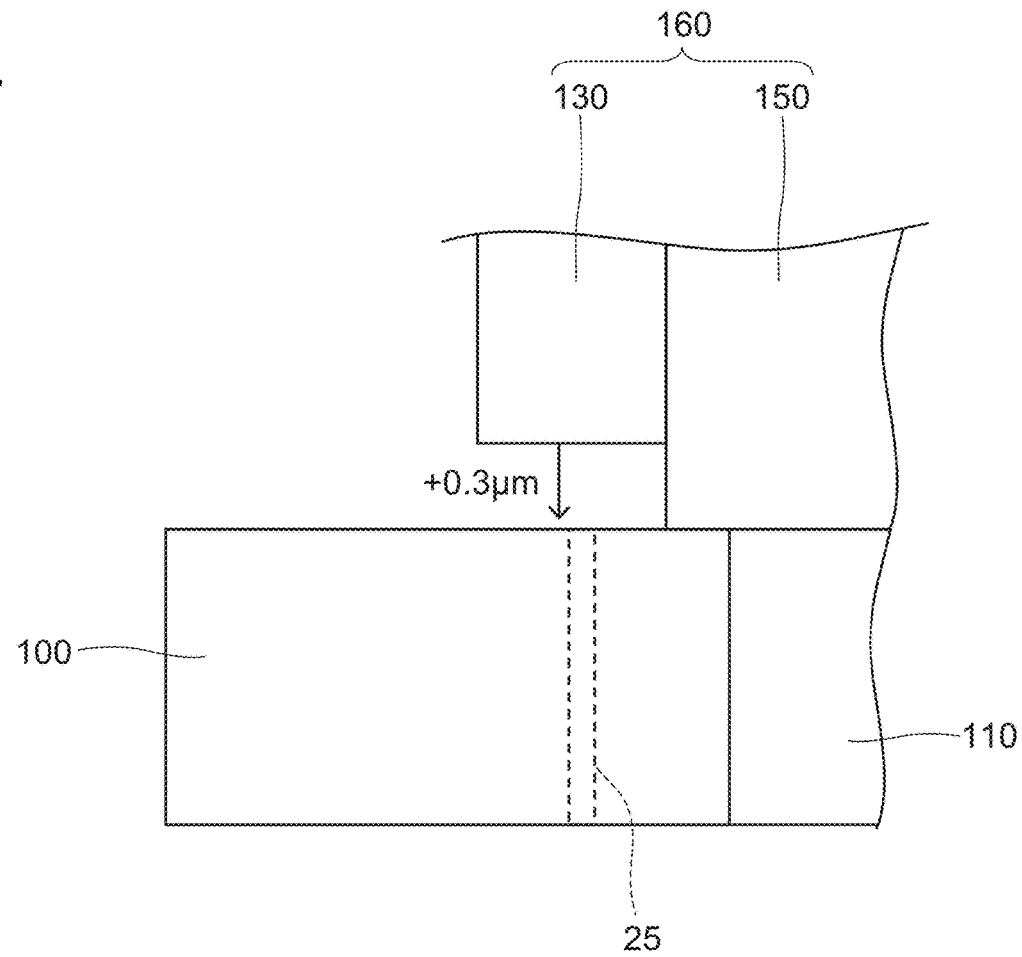
FIG. 14 is a side view illustrating principal parts of the magnetic head part and the light source-unit when the light source-unit is joined at a plus-shift position.
Figure 15:
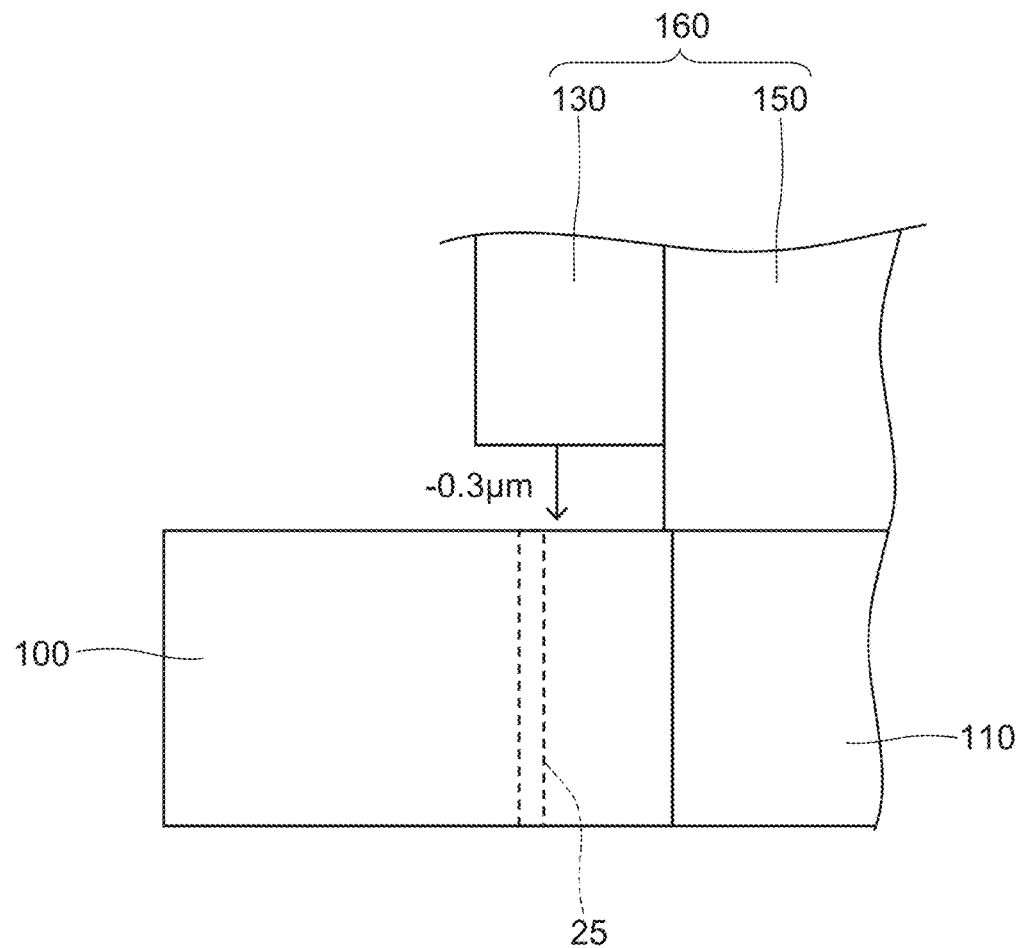
FIG. 15 is a side view illustrating principal parts of the magnetic head part and the light source-unit when the light source-unit is joined at a minus-shift position.

Then, FIG. 13 is a view illustrating the case which alignment of the light source-unit 160 to the core layer 25 is performed correctly (just alignment). FIG. 14 is a view illustrating the case which the light source-unit 160 is joined on the position near the front end-surface 103 (+0.3 μm) than the just alignment (also called plus alignment). FIG. 15 is a view illustrating the case which the light source-unit 160 is joined on the position far from the front end-surface 103 (−0.3 μm) than the just alignment (also called minus alignment).

Figure 16:
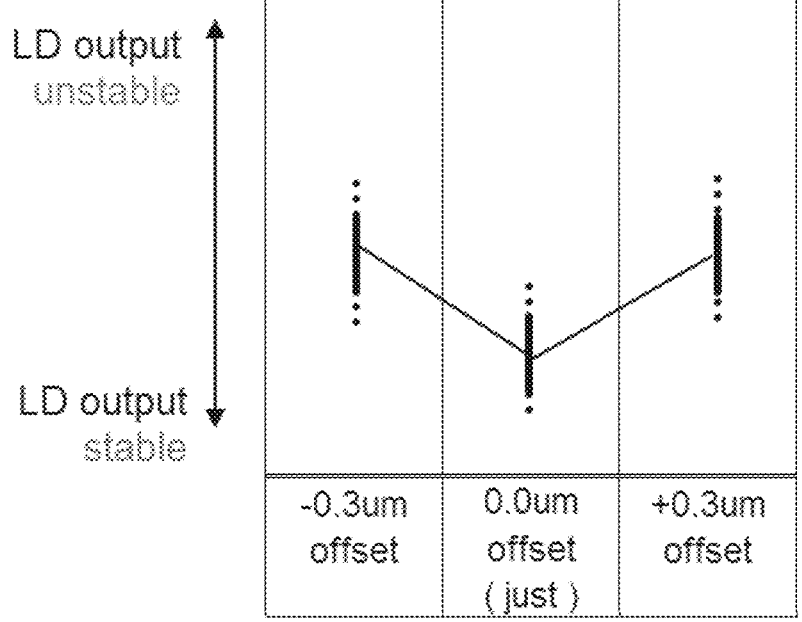
FIG. 16 is a view illustrating a change rate of optical output when the joined position is changed.

In FIG. 16, change rates of optical output from the ABS 101, concerning the above respective case, are illustrated. As illustrated in FIG. 16, in both the plus alignment and the minus alignment, because change rates of optical output increase than the just alignment, it can be confirmed that optical output becomes unstable.

Modified Example

Figure 10:
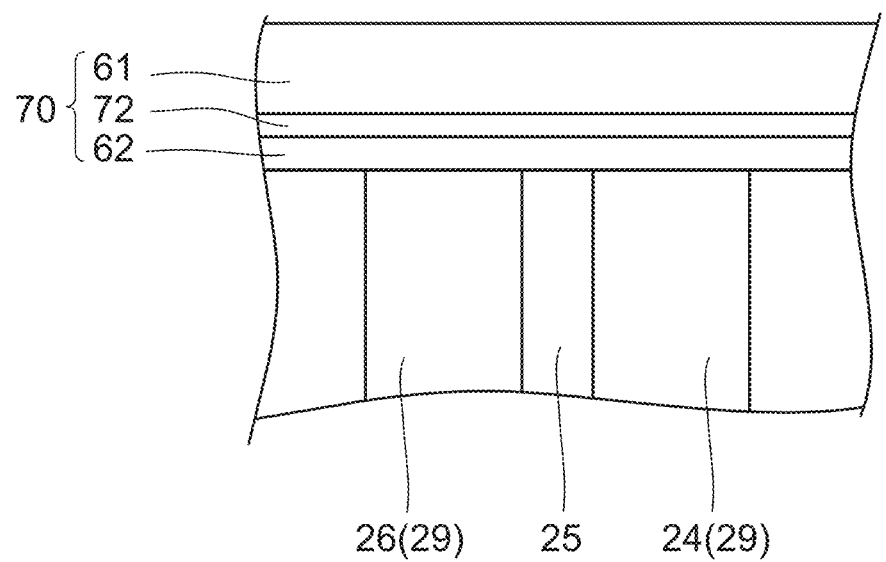
FIG. 10 is a view illustrating principal parts of the anti-reflection film and the magnetic head part according to a modified example.

FIG. 10 is a view illustrating the case the anti-reflection film 70 is formed on the light source-opposing surface 102. The anti-reflection film 70 has the three-layers stacked structure which a middle layer 72 is stacked between the first layer 61 and the second layer 62. The middle layer 72 is formed with aluminum oxide (AlO$_x$). The middle layer 72 is able to reduce the cladding-reflected light than the first layer 61, similar with the second layer 62.

Example

Inventors of the present invention formed many kinds of the first layers 61 and the second layers 62 for checking material and thickness, being able to reduce the reflected light effectively. The first layer 61 and the second layer 62, being able to reduce the reflected light effectively, are shown in FIG. 19. In FIG. 19, examples of material and thickness of the first layer 61 and the second layer 62 are shown. "Layer-1" means the second layer 62, "Layer-2" means the first layer 61. As illustrated in FIG. 19, not only tantalum oxide but also titanium oxide (for example, TiO$_2$) is able to be used as the second layer 62. The core-reflected light and the cladding-reflected light are effectively reduced even if the first layer 61 and the second layer 62, illustrated in FIG. 19, are formed.

Embodiments of Head Gimbal Assembly and Hard Disk Drive

Next, embodiments of the head gimbal assembly and hard disk drive will now be explained with reference to FIG. 17 to FIG. 18.

Figure 17:
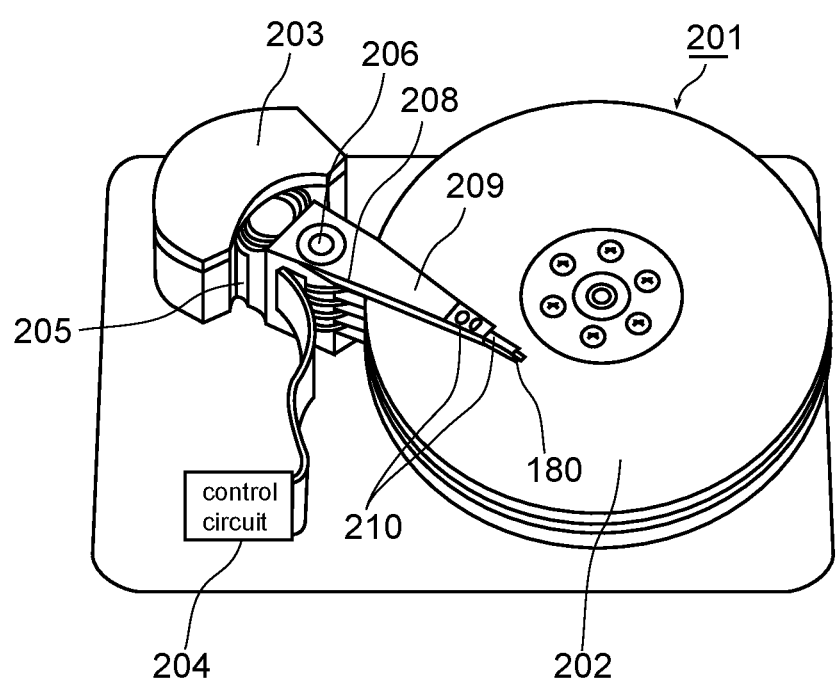
FIG. 17 is a perspective view illustrating a hard disk drive equipped with the thermally assisted magnetic head in FIG. 1.

FIG. 17 is a perspective view showing a hard disk drive 201 equipped with the above-mentioned thermally assisted magnetic head 180. The hard disk drive 201 includes a hard disk (magnetic recording medium) 202 rotating at a high speed and a head gimbal assembly (HGA) 210. The hard disk drive 201 is an apparatus which actuates the HGA 210, so as to record/reproduce data onto/from recording surfaces of the hard disk 202. The hard disk 202 has a plurality of (4 in the drawing) platters. Each platter has a recording surface opposing its corresponding the thermally assisted magnetic head 180.

The hard disk drive 201 positions the slider 120 on a track by an assembly carriage device 203. Further, the hard disk drive 201 has a plurality of drive arms 209. The drive arms pivot about a pivot bearing shaft 206 by means of a voice coil motor (VCM) 205, and are stacked in a direction along the pivot bearing shaft 206. Further, the HGA 210 is attached to the tip of each drive arm.

Further, the hard disk drive 201 has a control circuit 204 controlling recording/reproducing and the generation of light by the laser diode 207.

Figure 18:
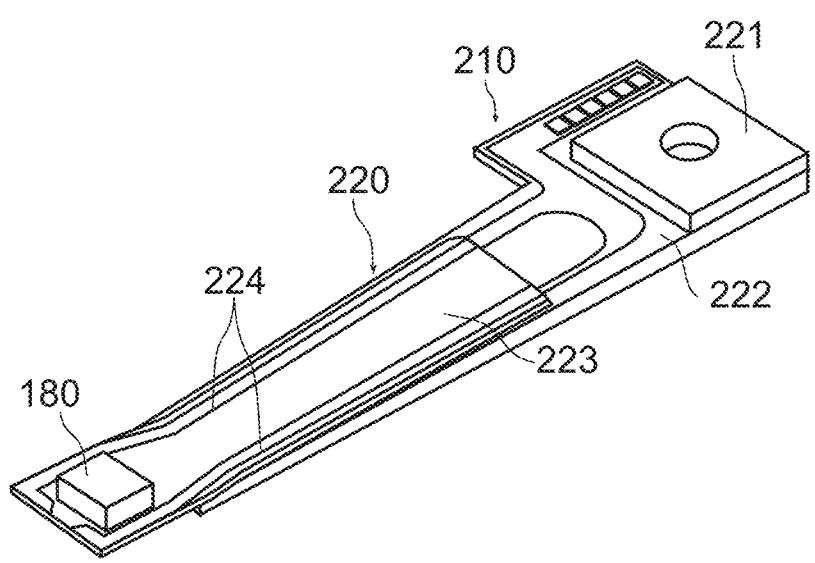
FIG. 18 is a perspective view illustrating a rear side of the HGA.

FIG. 18 is a perspective view illustrating a rear surface side of the HGA 210. In the HGA 210, the thermally assisted magnetic head 180 is fixed to a tip portion of a suspension 220. Further, in the HGA 210, one end portion of a wiring member 224 is electrically connected to a terminal electrode of the slider 120.

The suspension 220 has a load beam 222, a base plate 221 provided at a base portion of the load beam 222, a flexure 223 fixed to and supported on the load beam 222 from the tip end side to the front side of the base plate 221 and having elasticity, and the wiring member 224. The wiring member 224 has a lead conductor and connection pads electrically connected to both ends of the lead conductor.

In the hard disk drive 201, when the HGA 210 is rotated, the slider 120 moves in a radial direction of the hard disk 202, i.e., a direction traversing track lines.

The aforementioned HGA 210 and hard disk drive 201 have the thermally assisted magnetic head 180, thereby reflected light on the surface of the slider is reduced fully to stable the recording characteristic.

Though the above-mentioned embodiments explain a type in which a thin-film coil is wound like a flat spiral about the main magnetic pole layer by way of example, the present invention is also applicable to a type in which the thin-film coil is wound helically about the main magnetic pole layer.

This invention is not limited to the foregoing embodiments but various changes and modifications of its components may be made without departing from the scope of the present invention. Besides, it is clear that various embodiments and modified examples of the present invention can be carried out on the basis of the foregoing explanation. Therefore, the present invention can be carried out in modes other than the above-mentioned best modes within the scope equivalent to the following claims.

What is claimed is:

1. A thermally assisted magnetic head comprising:
   a slider; and
   a light source-unit joined to the slider,
   wherein the slider comprises a slider substrate and a magnetic head part formed on the slider substrate,
   wherein the light source-unit comprises a sub-mount, which is joined to the slider, and a light source which is arranged outside the sub-mount and joined on an outer surface of the sub-mount;
   wherein the magnetic head part comprises a medium-opposing surface opposing a magnetic recording medium, a light source-opposing surface arranged rear side of the medium-opposing surface, an anti-reflection film formed on the light source-opposing surface, a core layer which guides laser light from the light source-opposing surface to the medium-opposing surface and a cladding layer, made of a dielectric having refractive index lower than the core layer, arranged in the surrounding of the core layer,
   wherein the anti-reflection film comprises a stacked structure which a first layer and a second layer are stacked,
   wherein the second layer is formed with high refractive index dielectric having the refractive index higher than the first layer,
   wherein the anti-reflection film has an exposed surface which does not contact the light source-unit,
   wherein the light source opposes to the exposed surface of the anti-reflection film,
   wherein the second layer is formed on the light source-opposing surface and the first layer is formed on the second layer, and a thickness ratio of the first layer and the second layer ranges from 2.42 to 10.95 when the second layer is made of a first material, or from 2.68 to 43.8 when the second layer is made of a second material; wherein the first material is TaOx, the second material is TiO2, and the first layer is made of SiO2.

2. The thermally assisted magnetic head according to claim 1,
   wherein the anti-reflection film is formed with dielectrics which a dielectric-pattern, as a combination of dielectrics, is common with the core layer and the first layer.

3. The thermally assisted magnetic head according to claim 1,
   wherein the first layer is formed with dielectric having the refractive index lower than the cladding layer.

4. The thermally assisted magnetic head according to claim 1,
   wherein the anti-reflection film is formed without being sandwiched between the sub-mount and the light source-opposing surface, and the anti-reflection film has a three-layer stacked structure which a middle layer is stacked between the first layer and the second layer, as the stacked structure.

5. A method for reducing reflected light of laser light used in a thermally assisted magnetic head, the thermally assisted magnetic head comprising:
   a slider; and
   a light source-unit joined to the slider,
   wherein the slider comprises a slider substrate and a magnetic head part formed on the slider substrate,
   wherein the light source-unit comprises a sub-mount, which is joined to the slider, and a light source which is arranged outside the sub-mount and joined on an outer surface of the sub-mount;
   wherein the magnetic head part comprises a medium-opposing surface opposing a magnetic recording medium, a light source-opposing surface arranged rear side of the medium-opposing surface, a core layer which guides laser light from the light source-opposing surface to the medium-opposing surface and a cladding layer, made of a dielectric having the refractive index lower than the core layer, arranged in the surrounding of the core layer,
   a first layer and a second layer, formed with high refractive index dielectric having the refractive index higher than the first layer, are formed on the light source-opposing surface that the first layer has an exposed surface which does not contact the light source-unit and which the light source opposes, and the second layer is formed on the light source-opposing surface, the first layer is formed on the second layer, further a thickness ratio of the first layer and the second layer ranges from 2.42 to 10.95 when the second layer is made of a first material, or from 2.68 to 43.8 when the second layer is made of a second material, thereby the reflected light from the cladding layer is reduced, than the case which the only first layer is formed on the light source-opposing surface; wherein the first material is TaOx, the second material is TiO2, and the first layer is made of SiO2.

6. The method for reducing reflected light of laser light according to claim 5,
   wherein the second layer and the first layer are formed with dielectrics which a dielectric-pattern, as a combination of dielectrics, is common with the core layer and the first layer.

7. A head gimbal assembly comprising a thermally assisted magnetic head,
   wherein the thermally assisted magnetic head comprises:
   a slider; and
   a light source-unit joined to the slider,
   wherein the slider comprises a slider substrate and a magnetic head part formed on the slider substrate,
   wherein the light source-unit comprises a sub-mount, which is joined to the slider, and a light source which is arranged outside the sub-mount and joined on an outer surface of the sub-mount;

wherein the magnetic head part comprises a medium-opposing surface opposing a magnetic recording medium, a light source-opposing surface arranged rear side of the medium-opposing surface, an anti-reflection film formed on the light source-opposing surface, a core layer which guides laser light from the light source-opposing surface to the medium-opposing surface and a cladding layer, made of a dielectric having the refractive index lower than the core layer, arranged in the surrounding of the core layer, wherein the anti-reflection film comprises a stacked structure which a first layer and a second layer are stacked, wherein the second layer is formed with high refractive index dielectric having the refractive index higher than the first layer, wherein the anti-reflection film has an exposed surface which does not contact the light source-unit, wherein the light source opposes to the exposed surface of the anti-reflection film, wherein the second layer is formed on the light source-opposing surface and the first layer is formed on the second layer, and a thickness ratio of the first layer and the second layer ranges from 2.42 to 10.95 when the second layer is made of a first material, or from 2.68 to 43.8 when the second layer is made of a second material; wherein the first material is TaOx, the second material is TiO2, and the first layer is made of SiO2.

8. A hard disk drive comprising a head gimbal assembly having a thermally assisted magnetic head, and a magnetic recording medium opposing the thermally assisted magnetic head, wherein the thermally assisted magnetic head comprises:
a slider; and
a light source-unit joined to the slider, wherein the slider comprises a slider substrate and a magnetic head part formed on the slider substrate, wherein the light source-unit comprises a sub-mount, which is joined to the slider, and a light source which is arranged outside the sub-mount and joined on an outer surface of the sub-mount;

wherein the magnetic head part comprises a medium-opposing surface opposing the magnetic recording medium, a light source-opposing surface arranged rear side of the medium-opposing surface, an anti-reflection film formed on the light source-opposing surface, a core layer which guides laser light from the light source-opposing surface to the medium-opposing surface and a cladding layer, made of a dielectric having the refractive index lower than the core layer, arranged in the surrounding of the core layer, wherein the anti-reflection film comprises a stacked structure which a first layer and a second layer are stacked, wherein the second layer is formed with high refractive index dielectric having the refractive index higher than the first layer, wherein the anti-reflection film has an exposed surface which does not contact the light source-unit, wherein the light source opposes to the exposed surface of the anti-reflection film, wherein the second layer is formed on the light source-opposing surface and the first layer is formed on the second layer, and a thickness ratio of the first layer and the second layer ranges from 2.42 to 10.95 when the second layer is made of a first material, or from 2.68 to 43.8 when the second layer is made of a second material; wherein the first material is TaOx, the second material is TiO2, and the first layer is made of SiO2.

* * * * *